(12) United States Patent  
Haruki et al.

(10) Patent No.: US 9,136,056 B2
(45) Date of Patent: Sep. 15, 2015

(54) ELECTRONIC COMPONENT

(75) Inventors: Masayoshi Haruki, Nagaokakyo (JP);
Yoshio Takeuchi, Nagaokakyo (JP)

(73) Assignee: Murata Manufacturing Co., Ltd.,
Kyoto (JP)

( * ) Notice: Subject to any disclaimer, the term of this patent is extended or adjusted under 35 U.S.C. 154(b) by 0 days.

(21) Appl. No.: 13/420,688

(22) Filed: Mar. 15, 2012

(65) Prior Publication Data

US 2012/0236463 A1    Sep. 20, 2012

(30) Foreign Application Priority Data

Mar. 18, 2011 (JP) ................................. 2011-061414
Feb. 22, 2012 (JP) ................................. 2012-036401

(51) Int. Cl.
*H01G 4/228* (2006.01)
*H01G 4/232* (2006.01)
*H01G 2/06* (2006.01)
*H01G 4/005* (2006.01)

(52) U.S. Cl.
CPC .................. *H01G 2/06* (2013.01); *H01G 4/005* (2013.01); *H01G 4/228* (2013.01)

(58) Field of Classification Search
CPC .......... H01G 4/228; H01G 4/30; H01G 4/232
USPC .......................... 361/306.1, 306.3, 309, 308.1
See application file for complete search history.

(56) References Cited

U.S. PATENT DOCUMENTS

| 6,438,827 | B1 * | 8/2002 | Nakagawa et al. ............. 29/860 |
| 2002/0007908 | A1 | 1/2002 | Mamada |
| 2004/0183147 | A1 | 9/2004 | Togashi et al. |
| 2005/0041367 | A1 * | 2/2005 | Yoshii et al. .................. 361/303 |

FOREIGN PATENT DOCUMENTS

| CN | 1532860 A | 9/2004 |
| JP | 2000-235932 A | 8/2000 |
| JP | 2000-306764 A | 11/2000 |
| JP | 2004-288847 A | 10/2004 |
| JP | 2010-161172 A | 7/2010 |
| JP | 2012-33660 A | 2/2012 |

OTHER PUBLICATIONS

Haruki et al.; "Electronic Component"; U.S. Appl. No. 13/420,687, filed Mar. 15, 2012.
Official Communication issued in corresponding Japanese Patent Application No. 2012-036401, mailed on Nov. 11, 2014.

* cited by examiner

*Primary Examiner* — Eric Thomas
*Assistant Examiner* — Arun Ramaswamy
(74) *Attorney, Agent, or Firm* — Keating & Bennett, LLP

(57) ABSTRACT

An electronic component includes an electronic component body. The electronic component body includes a base member including two opposed end surfaces, and two outer electrodes respectively disposed on at least the two opposed end surfaces of the base member. Two connection portions of two metal terminals are respectively connected to the two outer electrodes. A relationship of 6.4≤ h/t is satisfied where h is a length of each of two leg portions of the two metal terminals and t is a thickness of each of the two leg portions of the two metal terminals.

12 Claims, 11 Drawing Sheets

ELECTRONIC COMPONENT

BACKGROUND OF THE INVENTION

1. Field of the Invention

The present invention relates to electronic components. In particular, the present invention relates to an electronic component such as a monolithic ceramic capacitor.

2. Description of the Related Art

In recent years, a reduction in size and an increase in functionality of electronic devices have rapidly progressed. Electronic components mounted on the electronic devices are also desired to be reduced in size. For example, a monolithic ceramic capacitor having a large electrostatic capacity is commercially produced as an alternative to an aluminum electrolytic capacitor because of the progress of a thin-layer technique and a multi-layer technique.

Referring to FIG. 10, a monolithic ceramic capacitor 1 includes a base member 4 in which a plurality of ceramic layers 2 and a plurality of inner electrodes 3 are alternately stacked. Adjacent inner electrodes 3 of the plurality of inner electrodes 3 are alternately led to opposite end surfaces of the base member 4. Outer electrodes 5 are formed on the end surfaces of the base member 4 to which the inner electrodes 3 are led. The outer electrodes 5 are electrically connected to the inner electrodes 3. With this configuration, an electrostatic capacity is formed between the outer electrodes 5 provided at the opposed end portions of the base member 4. The monolithic ceramic capacitor 1 is attached to a substrate 7 with solder 6. At this time, the outer electrodes 5 of the monolithic ceramic capacitor 1 are attached to the substrate 7 with the solder 6.

The material of the ceramic layers 2 of the monolithic ceramic capacitor 1 is typically a ferroelectric material such as barium titanate with a relatively high dielectric constant. However, the ferroelectric material has piezoelectricity and electrostriction. If an alternating voltage is applied to the monolithic ceramic capacitor 1, a mechanical strain is generated at the ceramic layers 2. If vibration caused by the strain is transmitted to the substrate 7 through the outer electrodes 5, the substrate 7 may entirely serve as an acoustic radiation surface and hence generate vibration sound such as chatter or other noise.

To address this, a configuration as shown in FIG. 11 is suggested, in which a pair of metal terminals 8 are connected to the outer electrodes 5 of the monolithic ceramic capacitor 1 with solder and the metal terminals 8 are soldered to the substrate 7 such that the a gap is provided between the substrate 7 and the monolithic ceramic capacitor 1. With this configuration, elastic deformation of the metal terminals 8 can absorb the mechanical strain, which is generated at the ceramic layers when the alternating voltage is applied, restrict transmission of the vibration to the substrate through the outer electrodes, and hence reduce generation of noise (see Japanese Unexamined Patent Application Publication No. 2004-288847, FIG. 21).

However, even when the configuration in which the monolithic ceramic capacitor is attached to the substrate by using the metal terminals is used, an effect of sufficiently restricting the vibration sound or chatter of the substrate is not attained.

SUMMARY OF THE INVENTION

Accordingly, preferred embodiments of the present invention provide an electronic component that can provide an effect of sufficiently restricting vibration sound even when the electronic component is attached to a substrate.

According to a preferred embodiment of the present invention, an electronic component includes an electronic component body and two metal terminals. The electronic component body includes a base member including two opposed end surfaces, and two outer electrodes respectively disposed on at least the two end surfaces of the base member. The two metal terminals include two connection portions respectively connected to the two outer electrodes of the electronic component body, and two leg portions respectively extending from the two connection portions. A relationship of $6.4 \leq h/t$ is satisfied where h is a length of each of the two leg portions of the two metal terminals in a direction parallel or substantially parallel to the end surfaces of the base member of the electronic component body and t is a thickness of each of the two leg portions of the two metal terminals in a direction perpendicular or substantially perpendicular to the end surfaces of the base member of the electronic component body.

In such an electronic component, the length h of each of the two leg portions of the two metal terminals is defined by the average value of the lengths of the two leg portions of the two metal terminals. Further, in such an electronic component, the thickness t of each of the two leg portions of the two metal terminals is defined by the average value of the thicknesses of the two leg portions of the two metal terminals.

If the length h of each of the leg portions of the metal terminals of the electronic component decreases, rigidity of the leg portions of the metal terminals increases. If the rigidity of the leg portions of the metal terminals increases, deformation generated at the electronic component body is hardly absorbed by the metal terminals. The deformation of the electronic component body is transmitted to the substrate, and vibration sound of the substrate increases. In contrast, if the length h of each of the leg portions of the metal terminals of the electronic component increases, the rigidity of the leg portions of the metal terminals decreases. If the rigidity of the leg portions of the metal terminals decreases, the deformation generated at the electronic component body is likely to be absorbed by the metal terminals. The deformation of the electronic component body is hardly transmitted to the substrate, and the vibration sound of the substrate decreases.

Also, if the thickness t of each of the leg portions of the metal terminals of the electronic component increases, the rigidity of the leg portions of the metal terminals increases, the deformation generated at the electronic component body is hardly absorbed by the metal terminals. The deformation of the electronic component body is transmitted to the substrate, and the vibration sound of the substrate increases. In contrast, if the thickness t of each of the leg portions of the metal terminals of the electronic component decreases, the rigidity of the leg portions of the metal terminals decreases, the deformation generated at the electronic component body is likely absorbed by the metal terminals. The deformation of the electronic component body is hardly transmitted to the substrate, and the vibration sound of the substrate decreases.

The relationship between the length h of each of the leg portions of the metal terminals and the thickness t of each of the leg portions of the metal terminals of the electronic component was checked. As the result, it was discovered that the vibration sound of the substrate can be properly prevented if the ratio of h/t is about 6.4 or larger, for example.

It is to be noted that, in the electronic component, the larger the length h of each of the leg portions of the metal terminals or the smaller the thickness t of each of the leg portions of the metal terminals, i.e., the larger the ratio of h/t, the higher the effect of restricting the vibration sound of the substrate. However, the fixing intensity between the metal terminals and the outer electrodes, the intensity of the leg portions of the metal terminals, and the intensity relating to the metal terminals such as the fixing intensity between the metal terminals and the substrate decrease. In order to obtain the sufficient intensity relating to the metal terminals, h/t is preferably about 10 or smaller, for example.

With the preferred embodiments of the present invention, an electronic component can be obtained, in which the deformation generated at the electronic component body is hardly transmitted to the substrate, and which can suppress and prevent the vibration sound of the substrate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
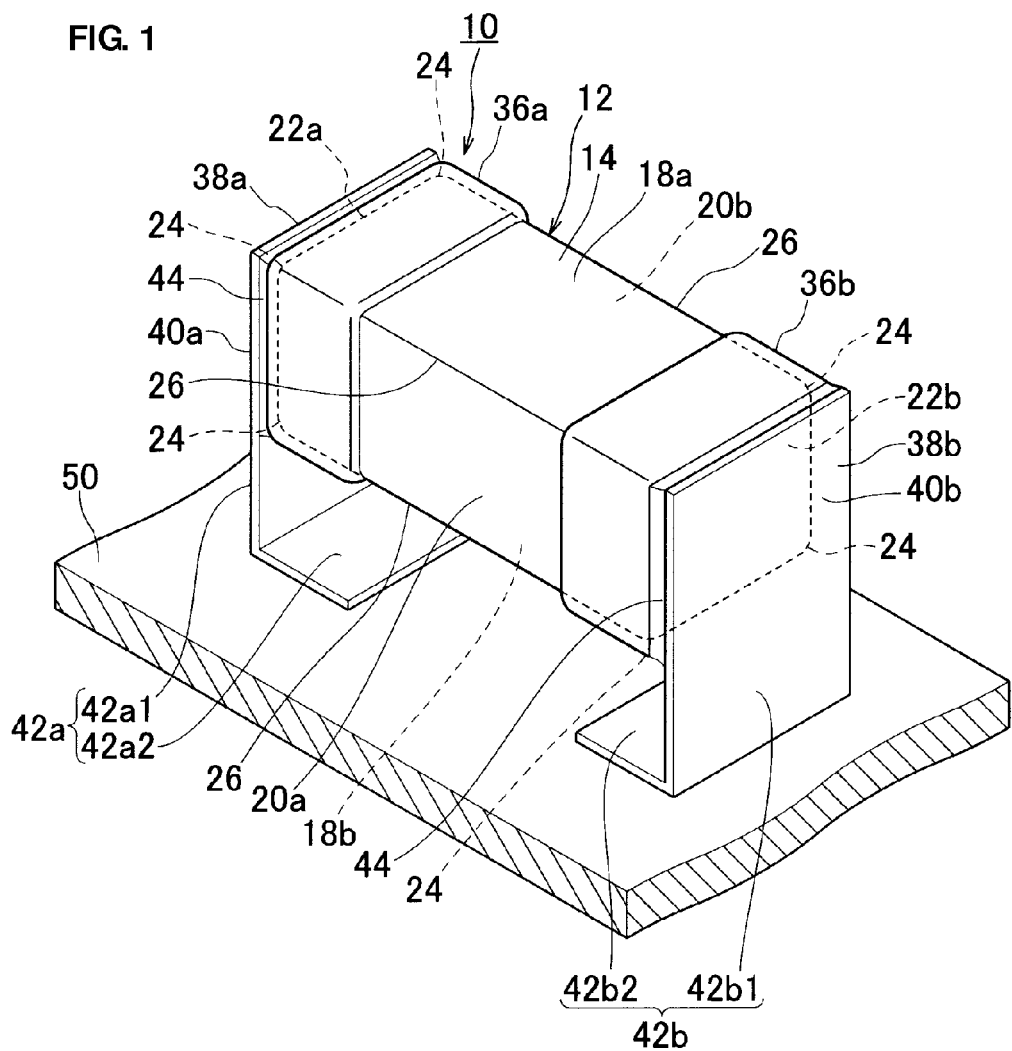
FIG. 1 is a perspective view showing an example of an electronic component according to a preferred embodiment of the present invention.
Figure 2:
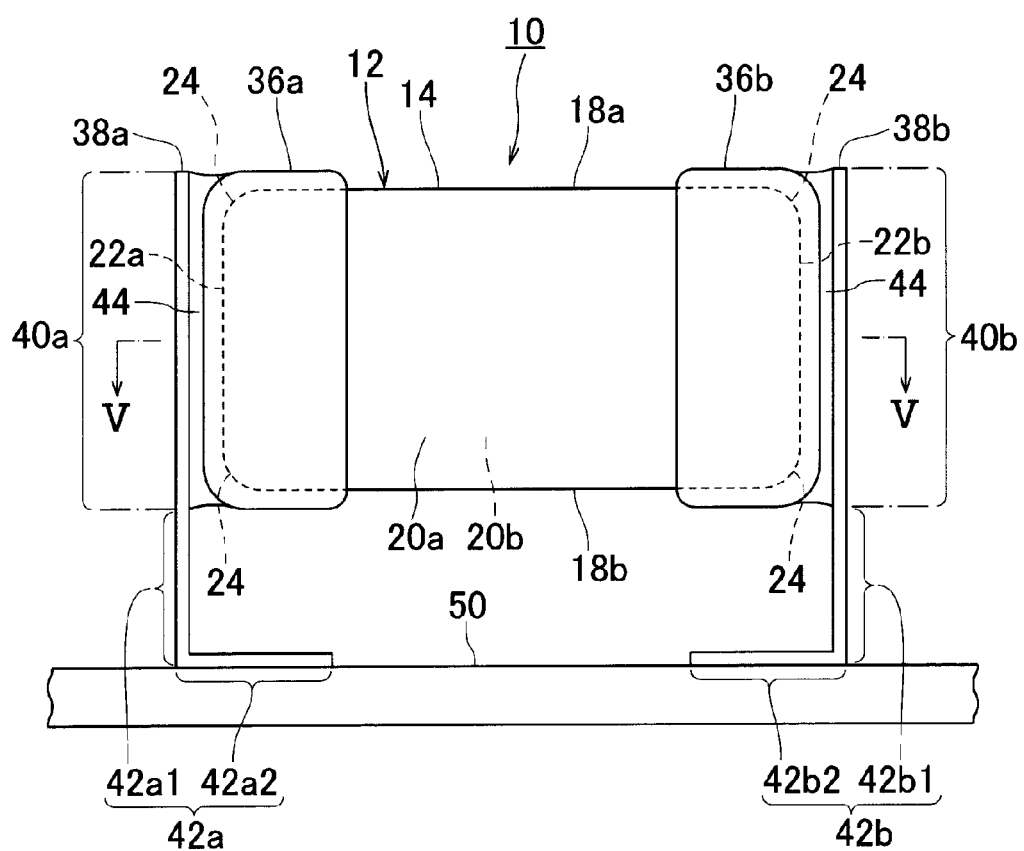
FIG. 2 is a front view of the electronic component shown in FIG. 1.
Figure 3:
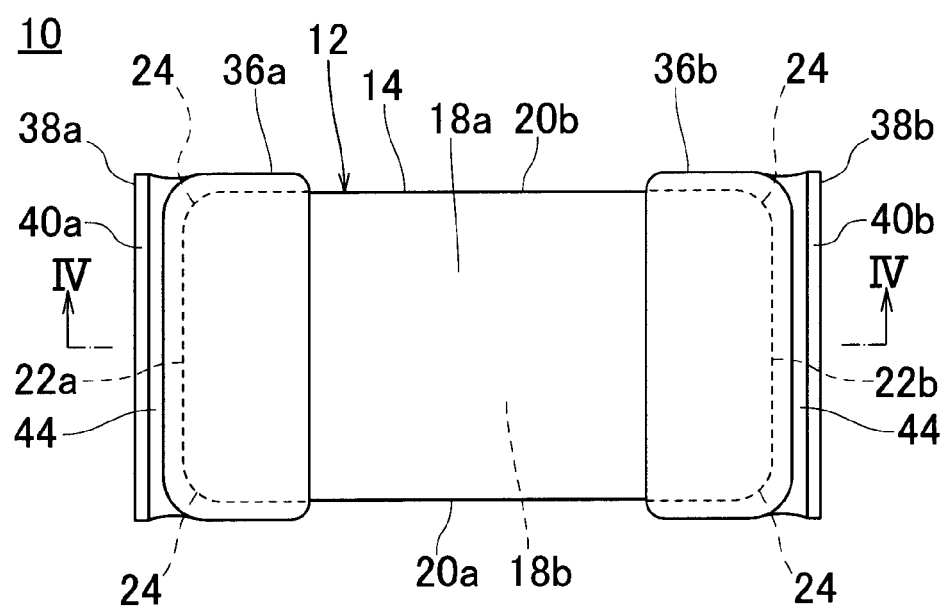
FIG. 3 is a top view of the electronic component shown in FIG. 1.
Figure 4:
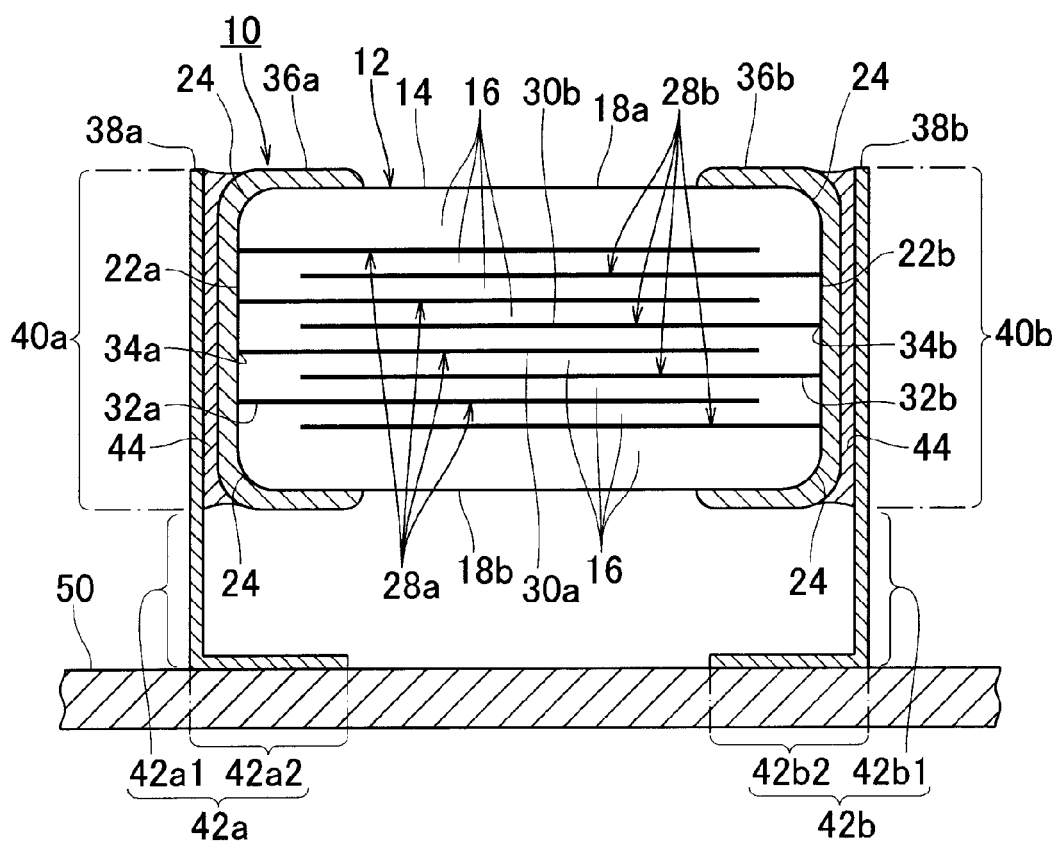
FIG. 4 is a cross-sectional view taken along line IV-IV in FIG. 3.
Figure 5:
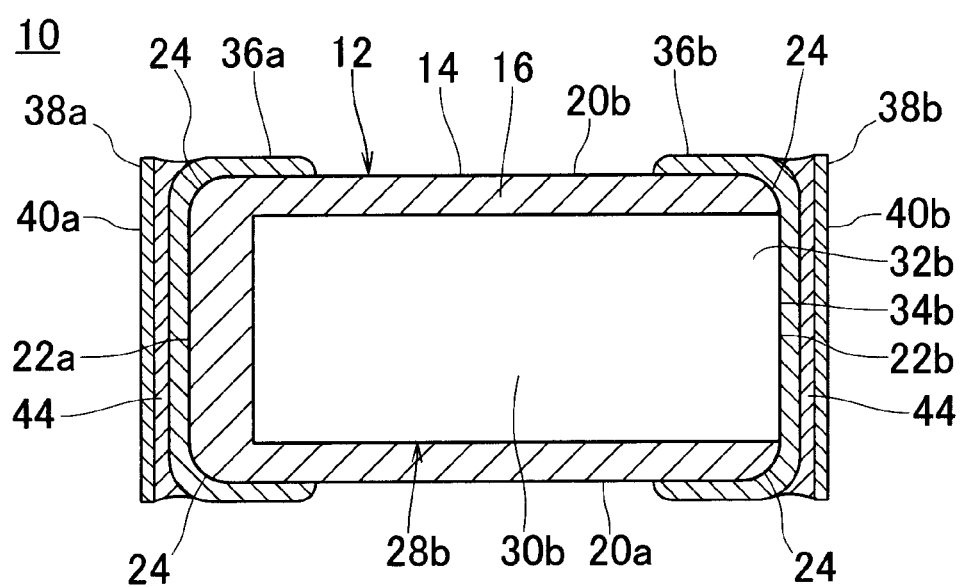
FIG. 5 is a cross-sectional view taken along line V-V in FIG. 2.

FIG. 1 is a perspective view showing an example of an electronic component according to a preferred embodiment of the present invention. FIG. 2 is a front view and FIG. 3 is a top view of the electronic component. Also, FIG. 4 is a cross-sectional view taken along line IV-IV in FIG. 3. FIG. 5 is a cross-sectional view taken along line V-V in FIG. 2.

An electronic component 10 shown in FIG. 1 is, for example, a monolithic ceramic capacitor and includes an electronic component body 12. The electronic component body 12 includes a base member 14 having, for example, a substantially rectangular-parallelepiped shape.

The base member 14 includes a plurality of stacked ceramic layers 16. The base member 14 includes opposed first principal surface 18a and second principal surface 18b, opposed first side surface 20a and second side surface 20b, and opposed first end surface 22a and second end surface 22b. Corner portions 24 and ridge portions 26 of the base member 14 are preferably rounded.

The ceramic material of the ceramic layers 16 included in the base member 14 may be, for example, a dielectric ceramic containing $BaTiO_3$, $CaTiO_3$, $SrTiO_3$, and $CaZrO_3$ as the main constituents. Alternatively, the ceramic material of the ceramic layers 16 may be a material in which an accessory constituent, such as a Mn compound, a Mg compound, a Si compound, a Co compound, a Ni compound, or a rare earth compound, is added to these main constituents. The thickness of each of the ceramic layers 16 of the base member 14 is preferably in a range from about 0.5 µm to about 10 µm, for example.

In the base member 14, a plurality of first inner electrodes 28a and a plurality of second inner electrodes 28b are alternately arranged between the ceramic layers 16. The material of the first inner electrodes 28a and second inner electrodes 28b may be, for example, Cu, Ni, Ag, Pd, an Ag—Pd alloy, or Au. The thickness of each of the first inner electrodes 28a or the thickness of each of the second inner electrodes 28b is preferably in a range from about 0.3 µm to about 2.0 µm, for example.

The first inner electrodes 28a include a first facing portion 30a, a first lead portion 32a, and a first exposed portion 34a. The first facing portion 30a faces the second inner electrodes 28b. The first lead portion 32a is led from the first facing portion 30a to the first end surface 22a of the base member 14. The first exposed portion 34a is exposed to the first end surface 22a of the base member 14.

Similarly to the first inner electrodes 28a, the second inner electrodes 28b include a second facing portion 30b that faces the first inner electrodes 28a, a second lead portion 32b that is led from the second facing portion 30b to the second end surface 22b of the base member 14, and a second exposed portion 34b that is exposed to the second end surface 22b of the base member 14.

A first outer electrode 36a and a second outer electrode 36b are arranged on the outer surface of the base member 14. The first outer electrode 36a is arranged so as to cover the first end surface 22a of the base member 14 and to partly surround the first and second principal surfaces 18a and 18b and the first and second side surfaces 20a and 20b. The first outer electrode 36a is connected to the first exposed portion 34a of the first inner electrode 28a at the first end surface 22a of the base member 14. Similarly, the second outer electrode 36b is arranged so as to cover the second end surface 22b of the base member 14 and to partly surround the first and second principal surfaces 18a and 18b and the first and second side surfaces 20a and 20b. The second outer electrode 36b is connected to the second exposed portion 34b of the second inner electrode 28b at the second end surface 22b of the base member 14.

The material of the first outer electrode 36a and second outer electrode 36b may be, for example, Cu, Ni, Ag, Pd, an Ag—Pd alloy, or Au. In particular, the material may be preferably Cu. The thickness of the first outer electrode 36a or the thickness of the second outer electrode 36b is preferably in a range from about 10 µm to about 80 µm, for example.

A first metal terminal 38a is attached to the first outer electrode 36a of the electronic component body 12 by bonding with solder. Similarly, a second metal terminal 38b is attached to the second outer electrode 36b of the electronic component body 12 by bonding with solder.

The first metal terminal 38a includes a first connection portion 40a that is, for example, a substantially quadrangular plate, and a first leg portion 42a extending from the first connection portion 40a and having, for example, a substantially L-shaped cross section. The first connection portion 40a of the first metal terminal 38a is, for example, a substantially quadrangular plate with the same size as the size of the first outer electrode 36a on the first end surface 22a of the base member 14. A side of the first connection portion 40a is connected to the first outer electrode 36a with solder 44. The first leg portion 42a of the first metal terminal 38a lifts the electronic component body 12 of the electronic component 10 off of a substrate 50 (described later). For example, the first leg portion 42a includes a first leg part 42a1 that is, for example, a substantially rectangular plate, and a first bent part 42a2 extending from the first leg part 42a1 and being, for example, a substantially quadrangular plate. The first leg part 42a1 of the first leg portion 42a extends from a lower end of the first connection portion 40a, i.e., from an end of the first connection portion 40a near the ridge portion 26 between the first end surface 22a and the second principal surface 18b of the base member 14, downward, i.e., in a direction that is parallel or substantially parallel to the end surfaces 22a and 22b of the base member 14 and perpendicular or substantially perpendicular to the principal surfaces 18a and 18b of the base member 14. The first leg part 42a1 and the first connection portion 40a are preferably provided in a single plane. Also, the first bent part 42a2 of the first leg portion 42a extends from a lower end of the first leg part 42a1, i.e., from an end of the first leg part 42a1 opposite to the first connection portion 40a, in the horizontal direction, i.e., in a direction that is parallel or substantially parallel to the principal surfaces 18a and 18b of the base member 14. The first bent part 42a2 is perpendicular or substantially perpendicular to the first leg part 42a1. In this case, the first bent part 42a2 of the first leg portion 42a extends from the first end surface 22a side of the base member 14 toward the second end surface 22b.

The second metal terminal 38b is preferably arranged symmetrically to the first metal terminal 38a. Hence, the second metal terminal 38b includes a second connection portion 40b that is a substantially quadrangular plate, and a second leg portion 42b having a substantially L-shaped cross section. The second connection portion 40b is connected to the second outer electrode 36b with solder 44. Similarly to the first leg portion 42a of the first metal terminal 38a, the second leg portion 42b of the second metal terminal 38b includes a second leg part 42b1 that is a substantially rectangular plate, and a second bent part 42b2 extending from the second leg part 42b1, being perpendicular or substantially perpendicular to the second leg part 42b1, and being a substantially quadrangular plate. It is to be noted that the second bent part 42b2 of the second leg portion 42b extends from the second end surface 22b side of the base member 14 toward the first end surface 22a. Also, the second leg part 42b1 of the second leg portion 42b of the second metal terminal 38b is arranged so as to be parallel or substantially parallel to the first leg part 42a1 of the first leg portion 42a of the first metal terminal 38a, at the lower side of the electronic component body 12, i.e., at the second principal surface 18b side of the base member 14. That is, the first metal terminal 38a and the second metal terminal 38b respectively include the leg portions 42a and 42b that protrude downward with respect to the lower surface of the electronic component body 12.

The metal terminals 38a and 38b preferably include a plated film disposed on the surfaces of metal terminal bodies. The terminal bodies are preferably formed of, for example, Ni, Fe, Cu, Ag, or Cr, or an alloy containing at least one of these metals as the main constituent. In particular, the terminal bodies are preferably formed of Ni, Fe, or Cr, or an alloy containing at least one of these metals as the main constituent, for example. To be more specific, the terminal bodies preferably use a Fe-42Ni alloy or a Fe-18Cr alloy as the base material. The thickness of each of the terminal bodies is preferably in a range from about 0.05 mm to about 0.5 mm.

The plated film includes, for example, a lower-layer plated film that covers the terminal bodies, and an upper-layer plated film that covers the lower-layer plated film. Each of the lower-layer plated film and upper-layer plated film may include a plurality of plated films.

The lower-layer plated film is preferably formed of, for example, Ni, Fe, Cu, Ag, or Cr, or an alloy containing at least one of these metals as the main constituent. In particular, the lower-layer plated film is preferably formed of Ni, Fe, or Cr, or an alloy containing at least one of these metals as the main constituent, for example. The thickness of the lower-layer plated film is preferably in a range from about 1.0 μm to about 5.0 μm, for example. Since each of the terminal bodies and the lower-layer plated film is preferably formed of Ni, Fe, or Cr with a high melting point, or an alloy containing at least one of these metals as the main constituent, for example, heat resistance of the outer electrodes 36a and 36b can be improved.

The upper-layer plated film is preferably formed of, for example, Sn, Ag, or Au, or an alloy containing at least one of these metals as the main constituent. In particular, the upper-layer plated film is preferably formed of Sn or an alloy containing Sn as the main constituent, for example. The thickness of the upper-layer plated film is preferably in a range from about 1.0 μm to about 5.0 μm, for example. Since the upper-layer plated film is preferably formed of Sn or an alloy containing Sn as the main constituent, for example, solderability between the metal terminals 38a and 38b and the outer electrodes 36a and 36b can be improved.

The solder 44 may preferably be, for example, LF solder, such as Sn—Sb solder, Sn—Ag—Cu solder, Sn—Cu solder, or Sn—Bi solder. In particular, if Sn—Sb solder is used, the content rate of Sb is preferably in a range from about 5% to about 15%, for example.

Figure 6:
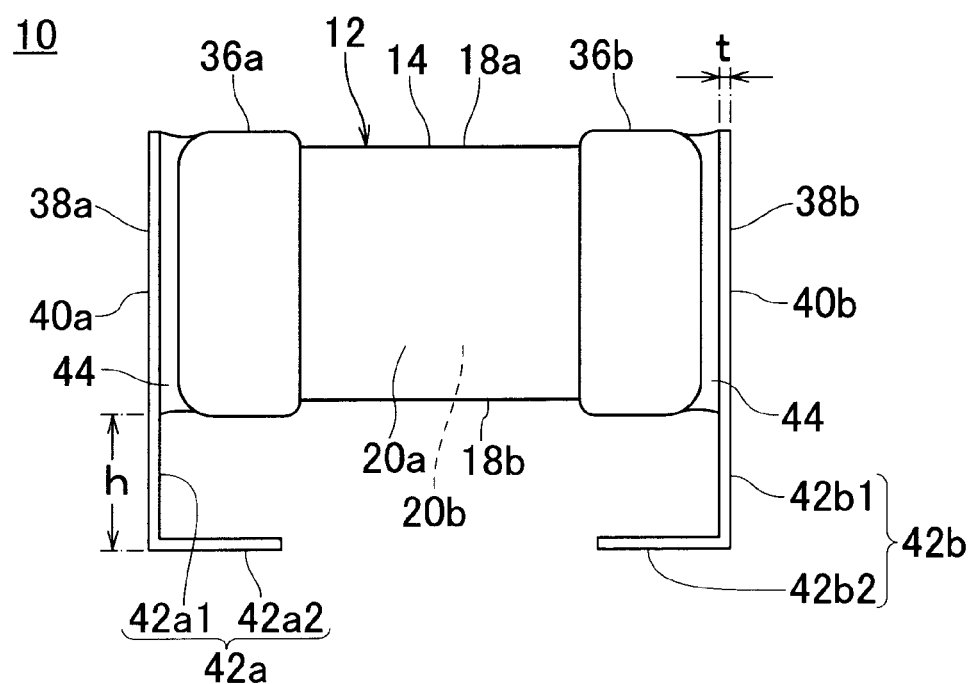
FIG. 6 is an explanatory view showing a length h and a thickness t of each of leg portions of metal terminals of the electronic component.

In such an electronic component 10, when h (see FIG. 6) is the length of each of the two leg portions 42a and 42b of the two metal terminals 38a and 38b in the direction parallel or substantially parallel to the end surfaces 22a and 22b of the base member 14 of the electronic component body 12, and t (see FIG. 6) is the thickness of each of the two leg portions 42a and 42b of the two metal terminals 38a and 38b in the direction perpendicular or substantially perpendicular to the end surfaces 22a and 22b of the base member 14 of the electronic component body 12, the length h and the thickness t are preferably determined to satisfy the relationship of about 6.4≤h/t. The length h of each of the two leg portions 42a and 42b of the two metal terminals 38a and 38b is a value indicated by the average value of heights $h_1$ and $h_2$ (see FIG. 7) from the lower surfaces of the two leg portions 42a and 42b of the two metal terminals 38a and 38b to the solder 44 of the connection portions 40a and 40b. Further, the thickness t of each of the two leg portions 42a and 42b of the two metal terminals 38a and 38b is a value indicated by the average value of thicknesses $t_1$ and $t_2$ (see FIG. 7) of the two leg portions 42a and 42b of the two metal terminals 38a and 38b. The electronic component 10 is preferably configured to satisfy about 6.4≤h/t ≤ about 10, for example. If the relationship of h/t≤ about 10 is satisfied, the electronic component can be provided, in which the deformation generated at the electronic component body is hardly transmitted to the substrate, which can suppress and prevent the vibration sound of the substrate, and which has sufficient fixing intensity between the outer electrodes of the electronic component body and the metal terminals.

Next, a non-limiting example of a method of manufacturing the electronic component 10 is described.

First, ceramic green sheets, inner-electrode conductive paste, and outer-electrode conductive paste are prepared. The ceramic green sheets and the conductive paste contain binders and solvents, which may be known organic binders and organic solvents.

Then, the inner-electrode conductive paste is printed on a ceramic green sheet with a predetermined pattern, for example, by screen printing. Thus, an inner-electrode pattern is formed.

Then, a predetermined number of outer-layer ceramic green sheets without the inner-electrode patterns printed thereon are stacked, ceramic green sheets with the inner-electrode patterns printed thereon are successively stacked on the outer-layer ceramic green sheets, and a predetermined number of the outer-layer ceramic green sheets are stacked on the ceramic green sheets with the inner-electrode patterns. Thus, a mother stack is fabricated.

Then, the mother stack is pressed in the stack direction, for example, by pressing with a hydrostatic pressure.

Then, the pressed mother stack is cut into pieces with a predetermined size to obtain a pre-firing ceramic stack. At this time, corner portions and ridge portions of the pre-firing ceramic stack may be rounded, for example, by barrel grinding.

Then, the pre-firing ceramic stack is fired. In this case, the firing temperature is preferably in a range from about 900° C. to about 1300° C., for example, although the firing temperature depends on the materials of the substrate and inner electrodes. The fired ceramic stack serves as the base member 14, the first inner electrodes 28a, and the second inner electrodes 28b of the monolithic ceramic capacitor.

The outer-electrode conductive paste is applied to the first and second end surfaces of the fired ceramic stack and the paste is baked. Thus, the outer electrodes 36a and 36b are formed. The baking temperature is preferably in a range from about 700° C. to about 900° C., for example. It is to be noted that baking of the outer-electrode conductive paste and firing of the pre-firing ceramic stack are performed, for example, in the air atmosphere, $N_2$ atmosphere, or moist $N_2$ atmosphere.

The first and second metal terminals 38a and 38b are connected to the outer electrodes 36a and 36b of the electronic component body 12 obtained as described above, by using the solder 44. At this time, the metal terminals 38a and 38b are connected to the outer electrodes 36a and 36b of the electronic component body 12, for example, by reflow soldering. The soldering temperature is in a range from about 270° C. to about 290° C. and the heat is applied for about 30 seconds or longer, for example.

The electronic component 10 thus obtained is mounted on a substrate 50. At this time, the first bent part 42a2 of the first leg portion 42a of the first metal terminal 38a and the second bent part 42b2 of the second leg portion 42b of the second metal terminal 38b are soldered to the substrate 50. Since the metal terminals 38a and 38b include the leg portions 42a and 42b, the electronic component body 12 is attached to the substrate 50 such that the electronic component body 12 is elevated above or raised off of the surface of the substrate 50.

When an alternating voltage is applied to the electronic component 10, a mechanical strain is generated at the ceramic layers 16. However, since the electronic component body 12 is supported by the metal terminals 38a and 38b such that the electronic component body 12 is elevated above or raised off of the surface of the substrate 50, elastic deformation of the metal terminals 38a and 38b absorbs the deformation generated at the electronic component body 12.

If the length h of each of the leg portions 42a and 42b of the metal terminals 38a and 38b decreases or if the thickness t of each of the leg portions 42a and 42b of the metal terminals 38a and 38b increases, the rigidity of the leg portions 42a and 42b of the metal terminals 38a and 38b increases. As a result, the leg portions 42a and 42b of the metal terminals 38a and 38b are hardly bent, and the deformation generated at the electronic component body 12 is hardly absorbed. Hence, the deformation generated at the electronic component body 12 is likely transmitted to the substrate 50, and the vibration sound of the substrate 50 increases.

In contrast, if the length h of each of the leg portions 42a and 42b of the metal terminals 38a and 38b increases or if the thickness t of each of the leg portions 42a and 42b of the metal terminals 38a and 38b decreases, the rigidity of the leg portions 42a and 42b of the metal terminals 38a and 38b decreases. As a result, the leg portions 42a and 42b of the metal terminals 38a and 38b are likely to be bent, and the deformation generated at the electronic component body 12 is likely absorbed. Hence, the deformation generated at the electronic component body 12 is hardly transmitted to the substrate 50, and the vibration sound of the substrate 50 decreases. However, if the length h of each of the leg portions 42a and 42b of the metal terminals 38a and 38b excessively increases or the thickness t of each of the leg portions 42a and 42b of the metal terminals 38a and 38b excessively decreases, the fixing intensity between the metal terminals 38a and 38b and the outer electrodes 36a and 36b, the intensity of the leg portions 42a and 42b of the metal terminals 38a and 38b, and the intensity relating to the metal terminals 38a and 38b such as the fixing intensity between the metal terminals 38a and 38b and the substrate 50 decrease.

In this electronic component 10, when h is the length of each of the two leg portions 42a and 42b of the two metal terminals 38a and 38b in the direction parallel or substantially parallel to the end surfaces 22a and 22b of the base member 14 of the electronic component body 12, and t is the thickness of each of the two leg portions 42a and 42b of the two metal terminals 38a and 38b in the direction perpendicular or substantially perpendicular to the end surfaces 22a and 22b of the base member of the electronic component body 12, the length h and the thickness t are determined to satisfy the relationship of about $6.4 \leq h/t \leq$ about 10, for example. The length h of each of the two leg portions 42a and 42b of the two metal terminals 38a and 38b is a value indicated by the average value of the heights $h_1$ and $h_2$ from the lower surfaces of the two leg portions 42a and 42b of the two metal terminals 38a and 38b to the solder 44 of the connection portions 40a and 40b. Further, the thickness t of each of the two leg portions 42a and 42b of the two metal terminals 38a and 38b is a value indicated by the average value of the thicknesses $t_1$ and $t_2$ of the two leg portions 42a and 42b of the two metal terminals 38a and 38b. As described above, if the value of h/t is about 6.4 or larger, the deformation generated at the electronic component body 12 can be properly absorbed. Also, if h/t is about 10 or smaller, the fixing intensity between the metal terminals 38a and 38b and the outer electrodes 36a and 36b, the intensity of the leg portions 42a and 42b of the metal terminals 38a and 38b, and the intensity relating to the metal terminals 38a and 38b such as the fixing intensity between the metal terminals 38a and 38b and the substrate 50 can sufficiently increase.

EXAMPLE 1

Electronic component bodies 12 (electronic component bodies of monolithic ceramic capacitors) with an approximate chip size of 3.2 (±0.2) mm×1.6 (±0.2) mm×1.6 (±0.2) mm (±0.2 is a manufacturing tolerance) and a capacity of about 10 μF were prepared, and electronic components 10 of samples 1 to 9 were fabricated as shown in Table 1 by the above-described manufacturing method. At this time, only samples with h of 0.8 mm were selected. Each of the electronic component bodies 12 was attached to the metal terminals 38a and 38b with Sn—Sb solder containing Sb by about 10%. Also, before the attachment of the metal terminals 38a and 38b to the electronic component body 12, referring to FIG. 7, the thicknesses $t_1$ and $t_2$ of the two leg portions 42a and 42b of the two metal terminals 38a and 38b were measured by a micrometer, and the average value of these thicknesses $t_1$ and $t_2$ was defined as the thickness t of each of the leg portions 42a and 42b of the metal terminals 38a and 38b. Then, for each of the electronic components 10, the relationship between the ratio h/t of the length h to the thickness t of each of the leg portions 42a and 42b of the metal terminals 38a and 38b and the vibration sound of the substrate 50 was checked. Also, the same electronic component body 12 (the electronic component body of the monolithic ceramic capacitor) as those used for the samples 1 to 9 was prepared as a comparative example. The comparative example does not include the metal terminals. The chip size may alternatively be, for example, 1.0 (±0.05) mm×0.5 (±0.05) mm×0.5 (±0.05) mm; 1.6 (±0.1) mm×0.8 (±0.1) mm×0.8 (±0.1) mm; 2.0 (±0.1) mm×1.25 (±0.1) mm×1.25 (±0.1) mm; or 3.2 (±0.3) mm×2.5 (±0.2) mm×2.5 (±0.2) mm.

Figure 7:
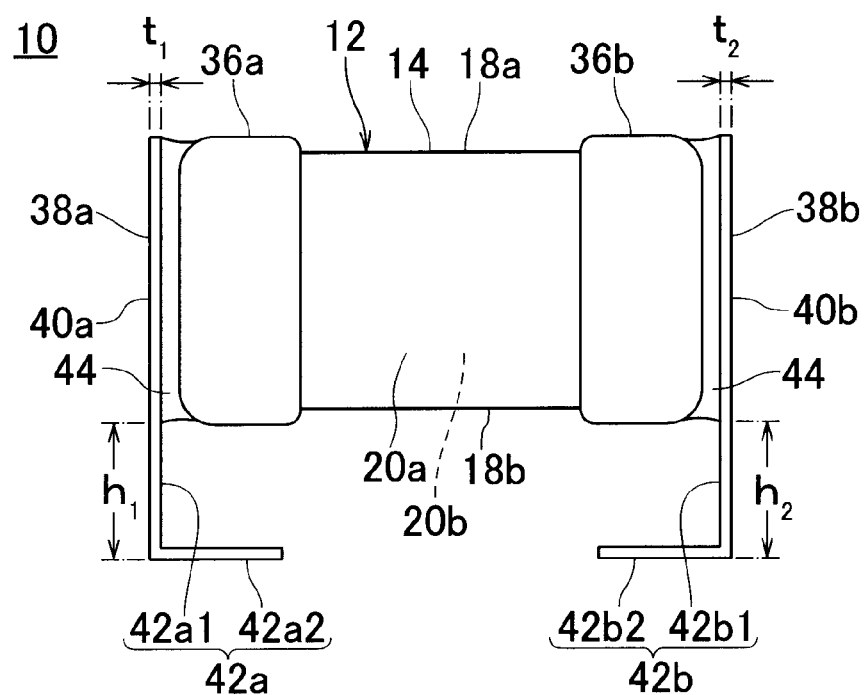
FIG. 7 is an explanatory view showing respective dimensions defining the length h and the thickness t of each of the leg portions of the metal terminals of the electronic component.

First, in order to obtain the length h of each of the leg portions 42a and 42b of the metal terminals 38a and 38b, referring to FIG. 7, the heights $h_1$ and $h_2$ from the lower surfaces of the two leg portions 42a and 42b of the two metal terminals 38a and 38b to the solder 44 of the connection portions 40a and 40b were measured. To be more specific, image processing was performed from a side surface of each monolithic ceramic capacitor by using an image dimension measurement system (IM-6140, manufactured by Keyence Corporation) to obtain the lowermost points of the solder 44 of the connection portions 40a and 40b at the leg portions 42a and 42b side. Then, perpendicular lines are plotted from the lowermost points to the lower surfaces of the two leg portions 42a and 42b of the metal terminals 38a and 38b, and the lengths of the perpendicular lines were measured along the outer sides of the metal terminals 38a and 38b as shown in FIG. 7. Then, the average value of these heights $h_1$ and $h_2$ was defined as the length h of each of the leg portions 42a and 42b of the metal terminals 38a and 38b.

Figure 8:
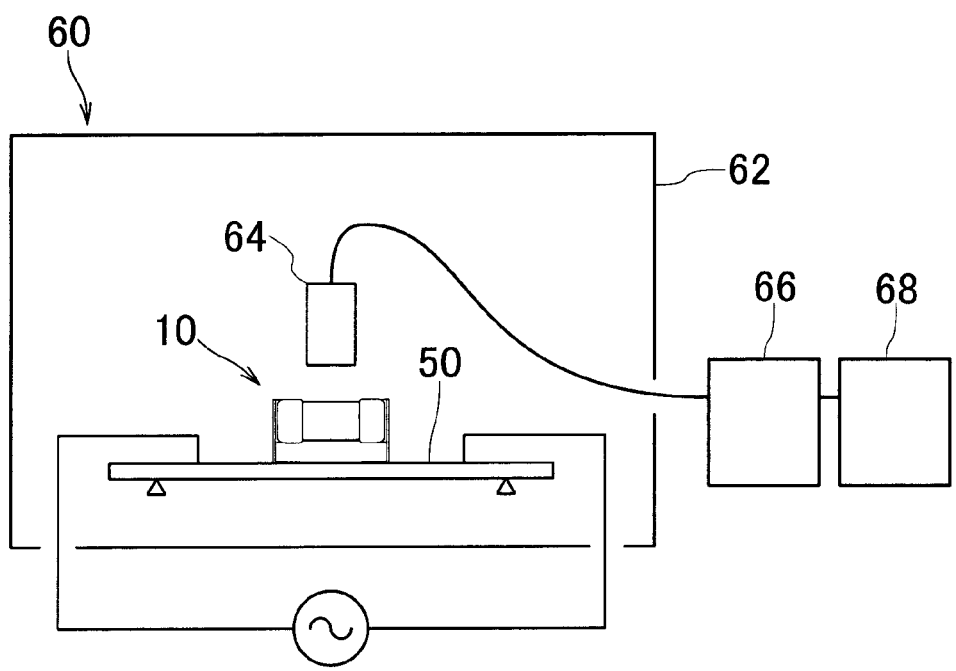
FIG. 8 is an explanatory view showing an example of a device that measures vibration sound of a substrate with the electronic component mounted.

Then, the electronic component 10 was attached to the substrate 50, and the vibration sound of the substrate 50 was measured by a device 60 as shown in FIG. 8. In particular, the substrate 50 with the electronic component 10 mounted thereon was arranged in an anechoic chamber 62, and an alternating voltage with a frequency of about 3 kHz and a voltage of about 1 Vpp was applied to the electronic component 10. Then, the vibration sound generated at this time was collected by a sound collector microphone 64, and the sound pressure level of the collected sound was measured by a noise level meter 66 and a FFT analyzer (CF-5220, manufactured by Ono Sokki Co., Ltd.) 68. The sound collector microphone 64 was arranged at a position separated from the substrate 50 only by a distance of about 3 mm.

The obtained results are shown in Table 1. Table 1 shows the relationship between h/t and the vibration sound, and also shows the sound pressure level ratio of the vibration sound pressure level to that in a case in which the metal terminals were not provided and the outer electrodes 36a and 36b of the electronic component body 12 were directly soldered to the substrate 50.

TABLE 1

|  | Thickness t of leg portion (mm) | h/t | Substrate vibration sound pressure level (dB) | Sound pressure level ratio (%) |
| --- | --- | --- | --- | --- |
| Sample 1 | 0.150 | 5.3 | 52.9 | 67.9 |
| Sample 2 | 0.125 | 6.4 | 46.6 | 59.7 |
| Sample 3 | 0.110 | 7.3 | 44.1 | 56.6 |
| Sample 4 | 0.100 | 8.0 | 41.9 | 53.7 |
| Sample 5 | 0.090 | 8.9 | 39.5 | 50.7 |
| Sample 6 | 0.075 | 10.7 | 35.5 | 45.6 |
| Sample 7 | 0.050 | 16.0 | 27.0 | 34.6 |
| Sample 8 | 0.030 | 26.7 | 14.7 | 18.9 |
| Sample 9 | 0.025 | 32.0 | 5.4 | 6.9 |
| Comparative example | — | — | 78.0 | 100.0 |

As is seen from Table 1, if h/t is about 6.4 or larger, the substrate vibration sound pressure level can be decreased by about 40% or more as compared with the electronic component without the metal terminals.

Figure 9:
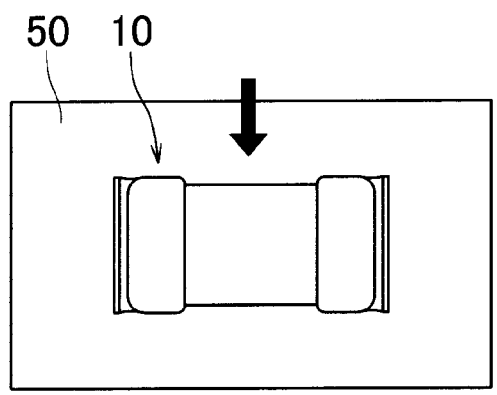
FIG. 9 is an explanatory view showing a method of measuring the intensity relating to the metal terminals of the electronic component.
Figure 10:
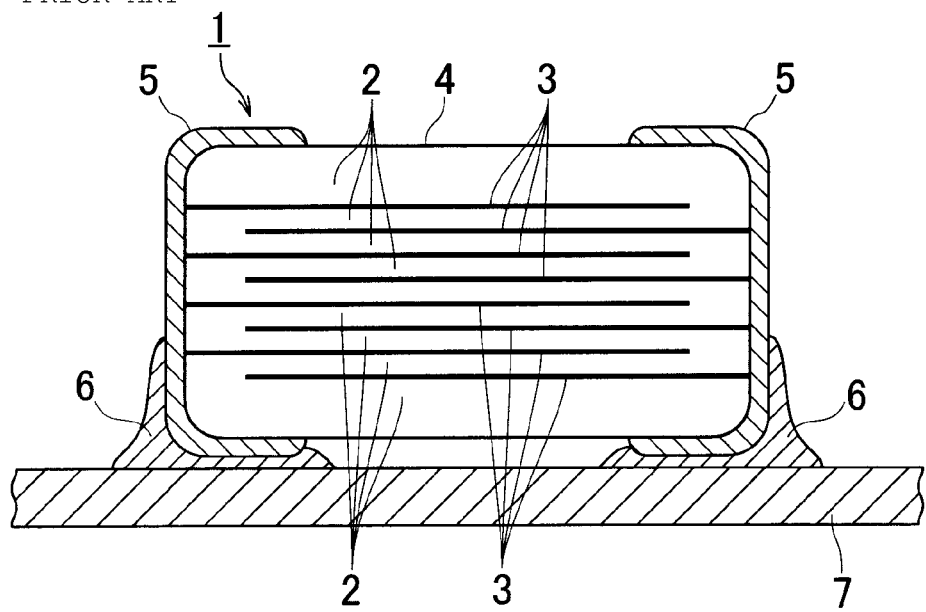
FIG. 10 is an explanatory view showing a state in which an electronic component of the related art is mounted on a substrate.
Figure 11:
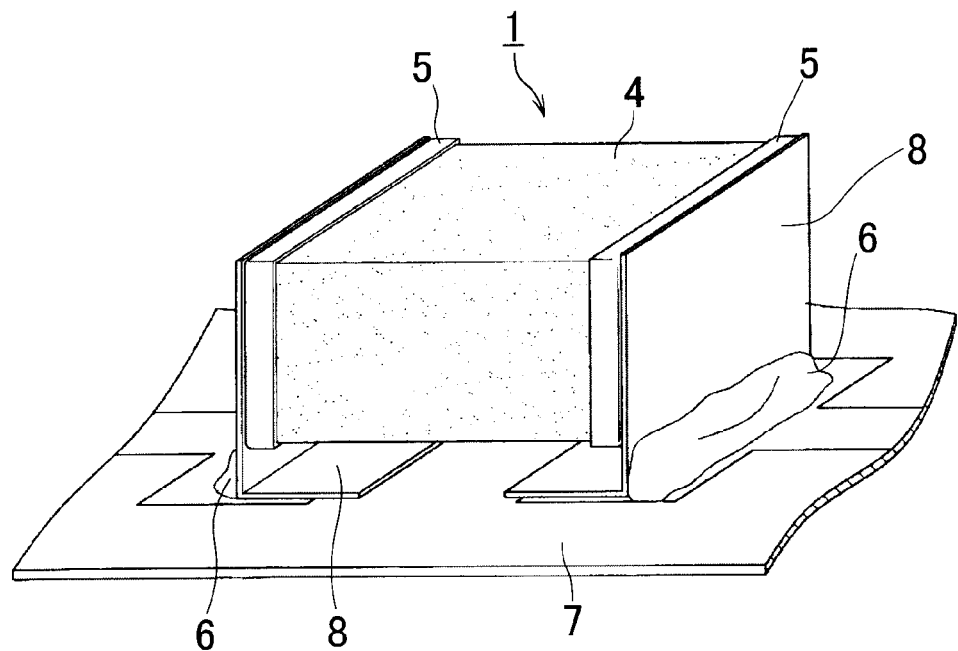
FIG. 11 is a perspective view showing an electronic component of the related art suggested for addressing a problem of the electronic component shown in FIG. 10.

Also, referring to FIG. 9, a force was applied to the side surface 20a of the electronic component body 12, and the fixing intensity between the metal terminals 38a and 38b and the outer electrodes 36a and 36b, the intensity of the leg portions 42a and 42b of the metal terminals 38a and 38b, and the intensity relating to the metal terminals 38a and 38b such as the fixing intensity between the metal terminals 38a and 38b and the substrate 50 were checked. As the result, if h/t was about 10 or smaller, the fixing intensity of about 30 N or larger could be obtained.

In the above-described electronic component 10, the thickness of each of the connection portions 40a and 40b of the metal terminals 38a and 38b preferably is the same as the thickness of each of the leg portions 42a and 42b of the metal terminals 38a and 38b. Alternatively, the thickness of each of the connection portions of the metal terminals may differ from the thickness of each of the leg portions of the metal terminals. However, like the above-described electronic component 10, if the thickness of each of the connection portions 40a and 40b of the metal terminals 38a and 38b is the same as the thickness of each of the leg portions 42a and 42b of the metal terminals 38a and 38b, the metal terminals 38a and 38b are easily manufactured, for example, by press molding.

Also, in the above-described electronic component 10, the bent parts 42a2 and 42b2 of the leg portions 42a and 42b of the metal terminals 38a 38b preferably are bent mutually inward. Alternatively, the bent parts 42a2 and 42b2 may be bent mutually outward. However, like the above-described electronic component 10, if the bent parts 42a2 and 42b2 of the leg portions 42a and 42b of the metal terminals 38a 38b are bent mutually inward, the mounting area of the electronic component can be small as compared with the electronic component in which the bent parts 42a2 and 42b2 are bent mutually outward.

The electronic component according to various preferred embodiments of the present invention are preferably used for a mobile terminal, for example, a personal computer such as a notebook personal computer, or a cellular phone.

While preferred embodiments of the invention have been described above, it is to be understood that variations and modifications will be apparent to those skilled in the art without departing from the scope and spirit of the invention.

The scope of the invention, therefore, is to be determined solely by the following claims.

What is claimed is:
1. A monolithic ceramic capacitor comprising:
an electronic component body including:
a base member including two opposed end surfaces; and
two outer electrodes respectively disposed at least on the two opposed end surfaces of the base member; and
two metal terminals including:
two connection portions respectively connected to the two outer electrodes of the electronic component body; and
two leg portions respectively extending from the two connection portions;
wherein
each of the two leg portions includes:
a leg part extending downward from a lowermost point of connection between the respective connection portion and the respective outer electrode along a straight line along which the respective connection portion extends; and
a bent part extending from an end of the leg part in a direction that is perpendicular or substantially perpendicular to the straight line such that the bent part is arranged to be surface mounted on and parallel or substantially parallel to a substrate;
each of the two metal terminals includes a first free end and a second free end opposite to the first free end;
the first free end is disposed at an uppermost portion of the electronic component body and the second free end is disposed below a lowermost portion of the electronic component body;
a relationship of about 6.4≤h/t is satisfied where h is a length of each of the leg parts of the two leg portions of the two metal terminals in a direction parallel or substantially parallel to the end surfaces of the base member of the electronic component body and t is a thickness of each of the leg parts of the two leg portions of the two metal terminals in a direction perpendicular or substantially perpendicular to the end surfaces of the base member of the electronic component body;
each of the connection portions of the two metal terminals is opposed to and extends along substantially all portions of a respective one of the two outer electrodes that is disposed adjacent thereto in the direction parallel or substantially parallel to the end surfaces of the base member of the electronic component body; and
the leg part extends from the lowermost point of the connection portion to the bent part, such that only open space is present between the lowermost point of the connection portion and the bent part.

2. The monolithic ceramic capacitor according to claim 1, wherein the length h of each of the leg parts of the two leg portions of the two metal terminals is defined by the average value of the lengths of the leg parts of the two leg portions of the two metal terminals.

3. The monolithic ceramic capacitor according to claim 1, wherein the thickness t of each of the leg parts of the two leg portions of the two metal terminals is defined by the average value of the thicknesses of the leg parts of the two leg portions of the two metal terminals.

4. The monolithic ceramic capacitor according to claim 1, wherein a relationship h/t≤ about 10 is satisfied.

5. A monolithic ceramic capacitor comprising:
an electronic component body including:
a base member including two opposed end surfaces; and
two outer electrodes respectively disposed at least on the two opposed end surfaces of the base member; and
two metal terminals including:
two connection portions respectively connected to the two outer electrodes of the electronic component body; and
two leg portions respectively extending from the two connection portions;
wherein
each of the two leg portions includes:
a leg part connected directly to and extending downward from the respective connection portion from a lowermost point of connection between the respective connection portion and the respective outer electrode along a straight line along which the respective connection portion extends, the leg part including a first end connected directly to the respective connection portion and a second end disposed downwardly from the first end along the straight line; and
a bent part connected directly to and extending from the second end of the leg part in a direction that is perpendicular or substantially perpendicular to the straight line such that the bent part is configured to be surface mounted on and parallel or substantially parallel to a substrate;
a relationship of about 6.4≤h/t is satisfied where h is a length of each of the leg parts of the two leg portions of the two metal terminals in a direction parallel or substantially parallel to the end surfaces of the base member of the electronic component body and t is a thickness of each of the leg parts of the two leg portions of the two metal terminals in a direction perpendicular or substantially perpendicular to the end surfaces of the base member of the electronic component body;
each of the connection portions of the two metal terminals is opposed to and extends along substantially all portions of a respective one of the two outer electrodes that is disposed adjacent thereto in the direction parallel or substantially parallel to the end surfaces of the base member of the electronic component body; and
the leg part extends from the lowermost point of the connection portion to the bent part, such that only open space is present between the lowermost point of the connection portion and the bent part.

6. The monolithic ceramic capacitor according to claim 5, wherein the length h of each of the leg parts of the two leg portions of the two metal terminals is defined by the average value of the lengths of the leg parts of the two leg portions of the two metal terminals.

7. The monolithic ceramic capacitor according to claim 5, wherein the thickness t of each of the leg parts of the two leg portions of the two metal terminals is defined by the average value of the thicknesses of the leg parts of the two leg portions of the two metal terminals.

8. The monolithic ceramic capacitor according to claim 5, wherein a relationship h/t≤ about 10 is satisfied.

9. A monolithic ceramic capacitor comprising:
an electronic component body including:
a base member including two opposed end surfaces; and
two outer electrodes respectively disposed at least on the two opposed end surfaces of the base member; and
two metal terminals including:
two connection portions respectively connected to the two outer electrodes of the electronic component body; and
two leg portions respectively extending from the two connection portions;

wherein
each of the two leg portions includes:
a leg part extending continuously downward from the respective connection portion from a lowermost point of connection between the respective connection portion and the respective outer electrode along a straight line along which the respective connection portion extends to a bend point at which a surface mount part of the respective leg portion extends perpendicular or substantially perpendicular to the straight line such that the surface mount part is configured to be surface mounted on and parallel or substantially parallel to a substrate;
a relationship of about 6.4≤h/t is satisfied where h is a length of each of the leg parts of the two leg portions of the two metal terminals in a direction parallel or substantially parallel to the end surfaces of the base member of the electronic component body and t is a thickness of each of the leg parts of the two leg portions of the two metal terminals in a direction perpendicular or substantially perpendicular to the end surfaces of the base member of the electronic component body;
each of the connection portions of the two metal terminals is opposed to and extends along substantially all portions of a respective one of the two outer electrodes that is disposed adjacent thereto in the direction parallel or substantially parallel to the end surfaces of the base member of the electronic component body; and
the leg part extends from the lowermost point of the connection portion to the bend point, such that only open space is present between the lowermost point of the connection portion and the bend point.

10. The monolithic ceramic capacitor according to claim 9, wherein the length h of each of the leg parts of the two leg portions of the two metal terminals is defined by the average value of the lengths of the leg parts of the two leg portions of the two metal terminals.

11. The monolithic ceramic capacitor according to claim 9, wherein the thickness t of each of the leg parts of the two leg portions of the two metal terminals is defined by the average value of the thicknesses of the leg parts of the two leg portions of the two metal terminals.

12. The monolithic ceramic capacitor according to claim 9, wherein a relationship h/t≤ about 10 is satisfied.

* * * * *